(No Model.)

H. G. NILES & P. VAN HUFFEL.
PLOW CLEVIS.

No. 402,609. Patented May 7, 1889.

Witnesses:

Inventor,
Henry G. Niles
Peter Van Huffel
by R. D. O. Smith att.

UNITED STATES PATENT OFFICE.

HENRY G. NILES AND PETER VAN HUFFEL, OF MISHAWAKA, INDIANA.

PLOW-CLEVIS.

SPECIFICATION forming part of Letters Patent No. 402,609, dated May 7, 1889.

Application filed January 31, 1889. Serial No. 298,176. (No model.)

*To all whom it may concern:*

Be it known that we, HENRY G. NILES and PETER VAN HUFFEL, both of Mishawaka, in the county of St. Joseph and State of Indiana, have invented new and useful Improvements in Plow-Clevises; and I do hereby declare that the following is a full and accurate account of the same, reference being had to the accompanying drawings, wherein—

Figure 1:
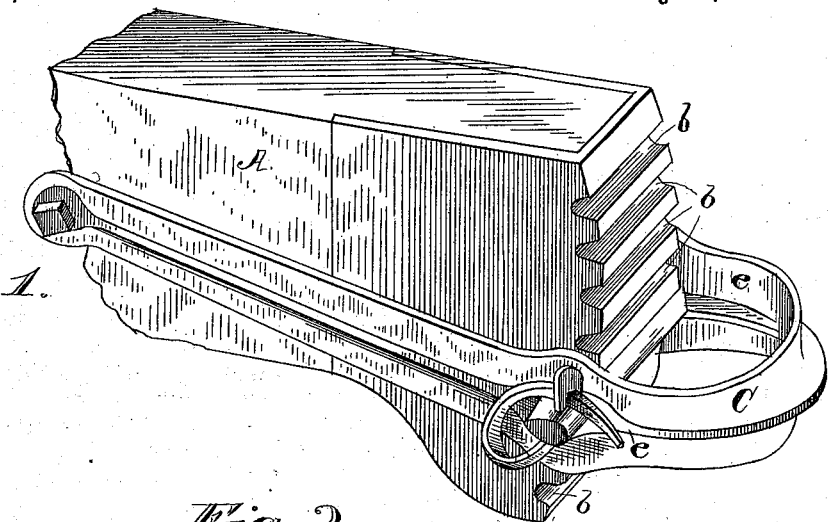
Figure 2:
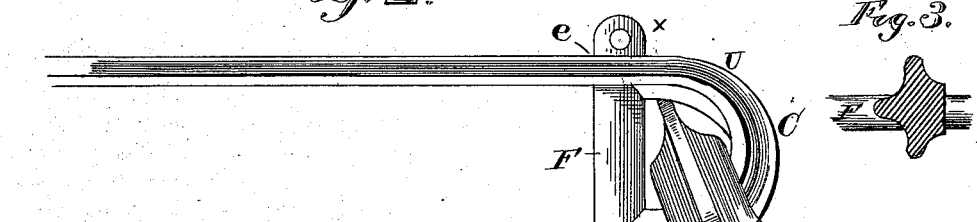
Figure 3:
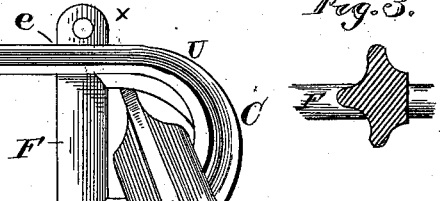
Figure 4:
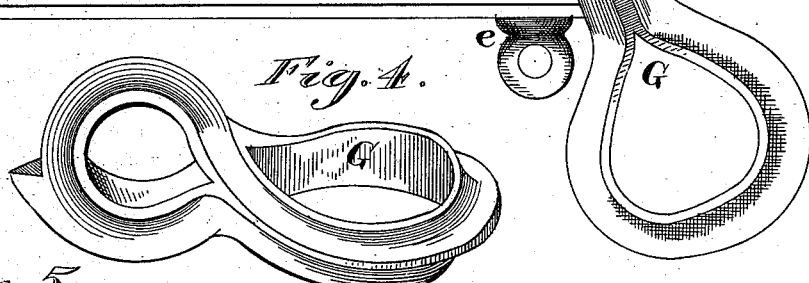
Figure 5:
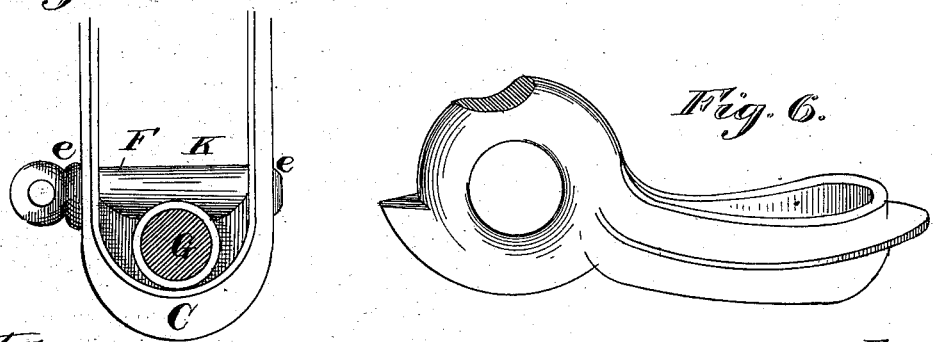
Figure 6:
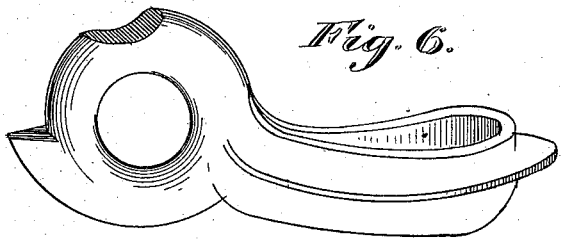

Figure 1 is a perspective view of our improvement applied to a plow-beam. Fig. 2 is a plan of the same. Fig. 3 is a section of the clevis on line $xx$. Fig. 4 is a perspective view of the clevis-link. Figs. 5 and 6 are views showing a modified structure, by which the parts become self-locking.

This improvement relates to that class of clevises which are adjustable in a vertical plane to raise or depress the line of draft, horizontal adjustment being secured by a pivotal movement of the beam itself; and it has particular reference to those plow-beams which are provided with a series of horizontal notches in the front end of the plow-beam, and to that class of clevises which engage with said notches and may be shifted from one notch to another by a longitudinal movement of the clevis on the plow-beam, said movement permitting the clevis to escape from one of said notches and to enter another. This longitudinal movement may be permitted by the removal of the pivot-bolt or by means of an L-shaped slot, whereof one arm is horizontal, instead of a simple hole for the pivot-bolt, so that by loosening said bolt the clevis may be moved thereon and slipped forward the length of said horizontal slot. Both of these methods are objectionable. They require the presence of tools which it is not convenient or desirable to carry about the plow; and our improvement is designed, first, to correct this defect by making the clevis adjustable upon a pivot-bolt which does not require to be either loosened or removed; and, second, in connection with our adjusting-pin, to provide a coupling-link which shall be free to swing in a horizontal plane, but not to move downward at its front end below the horizontal plane; and, third, to make the adjusting-pin self-locking when the clevis-link is in place.

The object of this first part is to obviate the necessity of tools to effect a change of the line of draft. The object of the second part is to sustain the link when the draft-strain is relaxed. The object of the third part is to make the adjusting-pin unremovable in the ordinary positions of the link.

A is the plow-beam, provided at its front end with the series of notches $b\ b$.

C is our clevis attached to the plow-beam by means of the pivot or joint bolt D, which passes through both arms of the clevis and through the beam.

Near the front end of the clevis there are holes $e\ e$ opposite the ends of the notches $b$, to permit the passage of the adjusting-pin F, which, when in said holes, also rests in one or another of said notches. The pin F may be secured in place in various ways; but the simplest and amply-efficacious way is by means of a leather key, as shown. This is the ordinary method, but is inferior to our method of locking by means of a notch, $k$, in the front edge of the adjusting-pin F, said notch being occupied at all ordinary times by the link G, as shown in Fig. 5, so that the pin cannot be withdrawn. A notch, $l$, in the upper part of the coupling-link will, however, when said link is moved to the proper position, permit said pin to pass out or in freely. The link will never assume that position except by design of the attendant, and therefore the adjusting-pin can never escape except by the design and assistance of the attendant.

When the horses cease pulling, the doubletrees will hang down, and if the coupling-link is free to hang down also it will frequently cramp when the team starts again and give to the plow a false line of draft. To prevent this we form the coupling-link G with a projection or lip, $h$, on one side, so placed that it will engage the lower side of the adjusting-pin F, which for that purpose is arranged to project a part of its diameter out of its notch; and to this end we have found it convenient to make the adjusting-pin egg-shaped or oval in cross-section. This engagement of the lip $h$ under the pin F prevents the link G from falling below the horizontal plane; but said link must be free to swing in a horizontal plane through a considerable arc, and in so doing the lip $h$ may pass off the pin F, unless it is made very broad and the notch $k$ very deep.

We prefer to form the clevis with internally-projecting ribs or shoulders $i$, which constitute resting-places for the lip $h$ when it passes off the pin F, and thereby the coupling-link is enabled to swing through a full half-circle without passing off its support or falling below the horizontal plane.

Having described our invention, we claim as new—

1. A plow-beam, A, provided with a series of notches, $b$, in its end, combined with a clevis, C, connected to said beam by a pivot-bolt, D, a removable adjusting-pin, F, adapted to rest in one or another of said notches and so large in its horizontal diameter that it will project out of said notch, and a coupling-link, G, provided with a lip, $h$, to engage under said pin, substantially for the purpose set forth.

2. A plow-beam, A, provided with a series of notches, $b$, in its front end, a clevis, C, connected to said beam by a pivot-bolt, D, and provided with a rib or shoulder, $i$, on the inner surface of its front end, an adjusting-pin, F, adapted to rest in one or another of said notches and project part way out of the same, and a coupling-link provided with a lip, $h$, to engage under said pin and ledge, substantially for the purpose set forth.

3. The clevis C, a removable adjusting-pin, F, provided with a notch, $k$, and a coupling-link, G, provided with the notch $l$ on its upper part, all in combination to retain said pin F in place except when said link is in a position which it cannot assume without assistance, substantially as set forth.

HENRY G. NILES.
PETER VAN HUFFEL.

Witnesses:
W. C. DRAPIER,
JOHN NILES.